United States Patent [19]

Bruce

[11] Patent Number: 5,281,068
[45] Date of Patent: Jan. 25, 1994

[54] SINGLE LARGE ROUND BALE HANDLING APPARATUS

[76] Inventor: Eldon H. Bruce, Rte. 2, Box 5, Nashoba, Okla. 74558

[21] Appl. No.: 859,163

[22] Filed: Mar. 27, 1992

[51] Int. Cl.$^5$ ............................................. B60P 3/00
[52] U.S. Cl. ................................. 414/24.5; 294/112; 414/24.6; 414/920
[58] Field of Search ................ 414/24.5, 24.6, 920; 294/112

[56] References Cited

U.S. PATENT DOCUMENTS

| | | | |
|---|---|---|---|
| 3,860,282 | 1/1975 | Johnson | 294/112 |
| 3,880,305 | 4/1975 | Van Polen | 414/24.5 |
| 3,897,880 | 8/1975 | Waske et al. | 414/24.5 |
| 3,968,940 | 7/1976 | Godbersen | 414/24.6 |
| 3,997,069 | 12/1976 | McCanse et al. | 414/24.6 |
| 4,024,970 | 5/1977 | Schirer | 414/24.6 X |
| 4,053,069 | 10/1977 | Love | 414/24.5 |
| 4,062,461 | 12/1977 | Vincent | 414/24.5 |
| 4,084,708 | 4/1978 | Goodvin | 414/24.6 |
| 4,095,706 | 6/1978 | Schwien et al. | 414/24.6 |
| 4,194,863 | 3/1980 | Vansickle et al. | 414/24.5 |
| 4,215,963 | 8/1980 | Doner | 414/24.5 |
| 4,348,143 | 9/1982 | Hedgespeth | 414/24.5 |
| 4,518,299 | 5/1985 | Vanderlei | 414/24.6 |
| 4,527,935 | 7/1985 | Fortenberry | 414/24.5 |
| 4,573,845 | 3/1986 | Carpenter | 414/24.5 |

FOREIGN PATENT DOCUMENTS 2337496 8/1977 France ................ 414/24.6

Primary Examiner—Michael S. Huppert
Assistant Examiner—Janice Krizek
Attorney, Agent, or Firm—John R. Flanagan

[57] ABSTRACT

A single large round bale handling apparatus includes an elongated generally upright support frame having a main portion and an upper end portion extending in an angular relationship relative to the main portion, an upper cross beam pivotally mounted to the upper end portion of the support frame and extending in transverse relation thereto, and a pair of lift arms pivotally mounted to and supported below the upper cross beam. Elongated bale impaling prongs are mounted in generally facing relation to one another to lower ends of the lift arms. The lift arms are pivotally coupled together at their upper ends. Elongated springs mounted between the lift arms and the opposite ends of the upper cross beams apply biasing forces to the lift arms to normally pivotally move the lift arms toward an outer bale releasing position. A flexible cable is guided about a location near the upper cross beam and above the pivotally coupled upper ends of the lift arms to apply a pulling force to the upper ends of the lift arms in order to pivotally move the lift arms from the outer bale releasing position to an inner bale gripping position. By releasing application of the pulling force, the lift arms will pivotally move back to the outer releasing position under the influence of the biasing force applied to the lift arms by the springs.

16 Claims, 3 Drawing Sheets

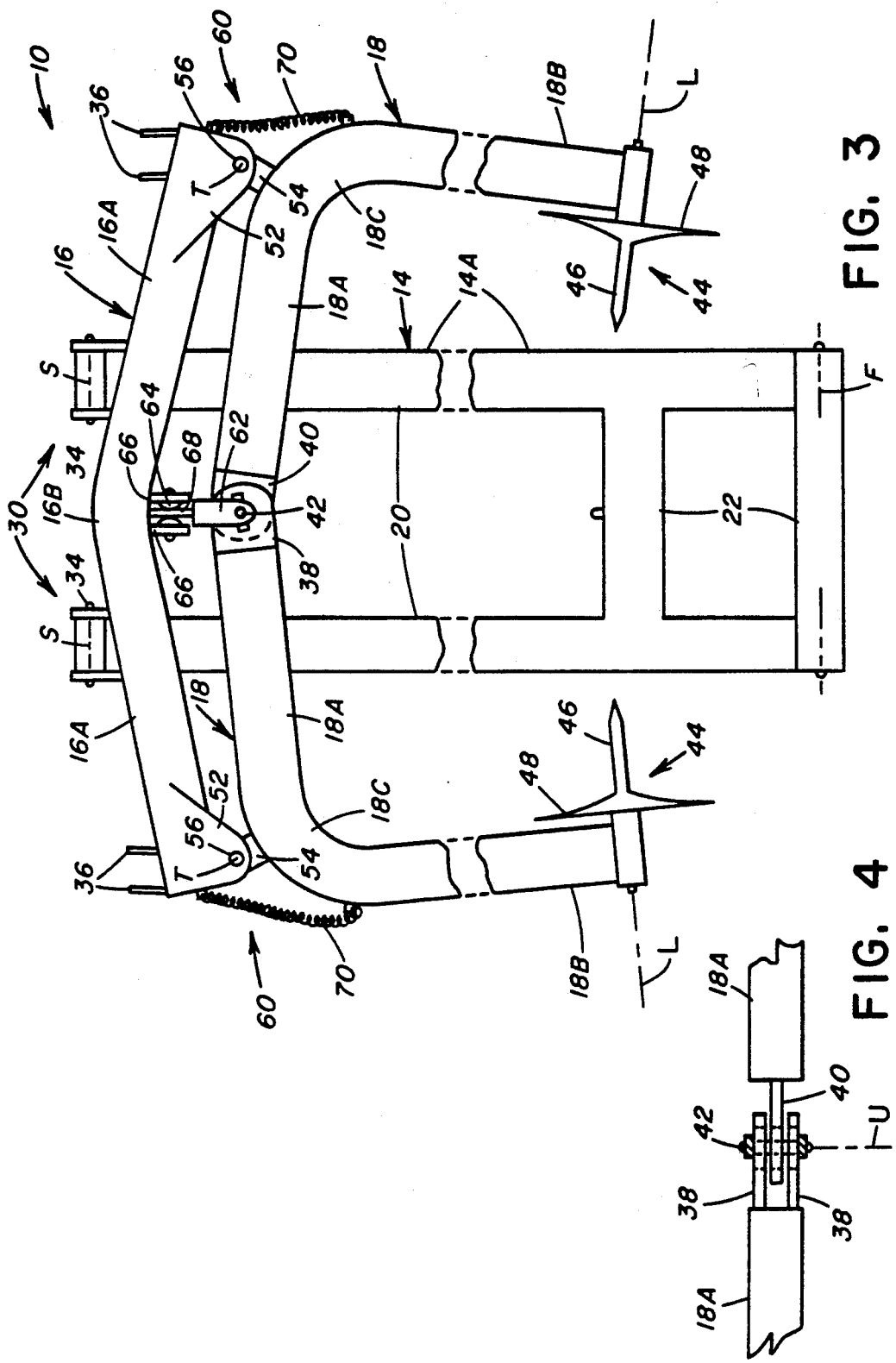

SINGLE LARGE ROUND BALE HANDLING APPARATUS

BACKGROUND OF THE INVENTION

1. Field of the Invention

The present invention generally relates to large round bale handling techniques and, more particularly, to a single large round bale handling apparatus.

2. Description of the Prior Art

Over the past decade or so, the use of large round bales of crop material, such as hay, have increased in popularity among farmers and ranchers in many regions of the United States and other countries. These large round bales are cylindrical in shape, are typically about four to six feet in axial length and four to six feet in diameter, and may weight anywhere from 800 to 1500 pounds. Bales of such sizes obviously cannot be handled manually. Thus, it is helpful to provide some apparatus to lift and transport the large round bales from one location to another.

The large round bales are sometimes transported individually on special purpose trailers employing an underslung pivotally-mounted cradle-type structure with fork arms adapted to extend under a bale or tine arms adapted to engage the opposite ends of the bale and a back or mast disposed at an angle to the fork or tine arms to provide additional support of the bale. Representative examples of such special purpose trailers are the ones disclosed in U.S. Pat. Nos. to Schwien et al (4,095,706), Hedgespeth (4,348,143) and Vanderlei (4,518,299). The underslung cradle-type structure is typically pivoted on a two-wheel trailer frame for transport by a pick-up truck or small tractor.

Problems and drawbacks appear to exist with respect to these proposed prior art special purpose trailers utilizing a bottom-mounted pivotal cradle-type bale-carrying structure. These problems and drawbacks appear to arise from inadequate structural rigidity, undue complexity of construction, inadequate ground clearance, and parts subject to early wear and failure under the heavy loads transported over rough terrain.

Consequently, a need still exists for an improved single large bale handling apparatus which will avoid the problems and drawbacks associated with the prior art special purpose trailers while improving the capability of handling single large round bales.

SUMMARY OF THE INVENTION

The present invention provides a large round bale handling apparatus designed to satisfy the aforementioned needs. The large round bale handling apparatus of the present invention utilizes a top-mounted pivotal swing-type bale-carrying structure having a compact, relatively simple, and durable construction. Also, the bale handling apparatus is versatile in that it can be supported by either a wheeled trailer, a truck bed or a three-point tractor hitch. Further, the bale handling apparatus can be operated to load, tranport, and unload a large round bale as well as to unroll the large round bale on the ground when desired for feeding purposes.

Accordingly, the single large round bale handling apparatus comprises: (a) an elongated generally upright-extending support frame; (b) an upper cross beam mounted to an upper end of the support frame and extending in transverse relation thereto; (c) a pair of lift arms having upper ends pivotally connected together and lower ends mounting a pair of bale engaging members in generally facing relation toward one another, the lift arms being mounted to and supported below the upper cross beam to undergo pivotal movement relative to the upper cross beam and thereby relative to one another between an inner bale gripping position and an outer bale releasing position in which the bale engaging members are disposed closer to one another in the inner gripping position than in the outer releasing position of the lift arms; (d) means for applying a pulling force to the upper ends of the lift arms so as to cause pivotal movement of the lift arms relative to the upper cross beam from the bale releasing position to the bale gripping position; and (e) means for apply a biasing force to the lift arms so as to cause pivotal movement of lift arms relative to the upper cross beam from the bale gripping position back to the bale releasing position upon release of application of the pulling force to the lift arms. The bale handling apparatus also includes a first, second, and third pivotal coupling arrangements and a coupling member.

The support frame includes a main portion and an upper end portion extending in angular relationship relative to the main portion thereof. The first pivotal coupling arrangement is provided for mounting the support frame to a mobile carrier, such as either a wheeled trailer, a truck bed or a three-point tractor hitch, so as to be capable of undergoing pivotal movement relative to the mobile carrier about a first axis between a generally upright bale carrying position and a generally rearwardly inclined bale loading and unloading position.

The second pivotal coupling arrangement pivotally connects the upper cross beam to the upper end of the support frame so as to support the upper cross beam below the upper end of the support. The upper cross beam extends in a transverse relation to the support frame and can undergo pivotal movement relative to the support frame about a second axis extending generally parallel to the first axis.

Each lift arm has arcuate shapes formed by an upper coupling portion, a lower load bearing portion, and an elbow-shaped middle portion interconnecting the upper and lower portions. The lift arms are pivotally coupled together at their upper ends. The bale engaging members are elongated bale impaling prongs mounted at the respective lower ends of the lift arms and generally facing toward one another and adapted to penetrate opposite sides of a large round bale positioned between the lift arms when the lift arms are moved from their outer bale releasing position to inner bale gripping position.

The third coupling arrangement pivotally connects the lift arms at their elbow-shaped middle portions with the opposite ends of the upper cross beams. In such manner, the lift arms are supported below the upper cross beam in an aligned mirror image relationship to one another and can undergo pivotal movement about a pair of third axes extending generally parallel to one another and transverse to the first and second axes.

The pulling-force applying means includes a guide element mounted to the middle of the upper cross beam and an elongated flexible cable pivotally attached at one end to the upper ends of the pivotal arms and extending over the guide element and therefrom for attachment to an external device such that relative movement between the flexible cable and the support frame can apply a pulling force to the upper ends of the lift arms by the flexible cable and thereby pivotally move the lift arms relative to one another and to the upper cross beam about the third axes from the outer bale releasing position to the inner bale gripping position. Once the lift arms reach the bale gripping position, continued relative movement between the flexible cable and support frame causes the support frame, and the upper cross beam and lift arms therewith, to move from the rearwardly inclined bale loading and unloading position toward the generally upright bale carrying position of the support frame.

The biasing force-applying means is a pair of elongated springs attached at opposite ends to and extending between the respective lower load bearing portions of the lift arms and the opposite ends of the upper cross beam. The springs apply respective biasing forces to the lift arms to cause them to pivotally move from the inner bale gripping position back to the outer releasing position upon releasing of the application of the pulling force on the upper ends of the lift arms.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a front elevational view of the bale handling apparatus of FIG. 2 with the pivotal lift arms shown in an inner bale gripping position.

FIG. 4 is an enlarged fragmentary top plan view of a portion of the bale handling apparatus as seen along line 4—4 of FIG. 2.

DETAILED DESCRIPTION OF THE INVENTION

Figure 1:
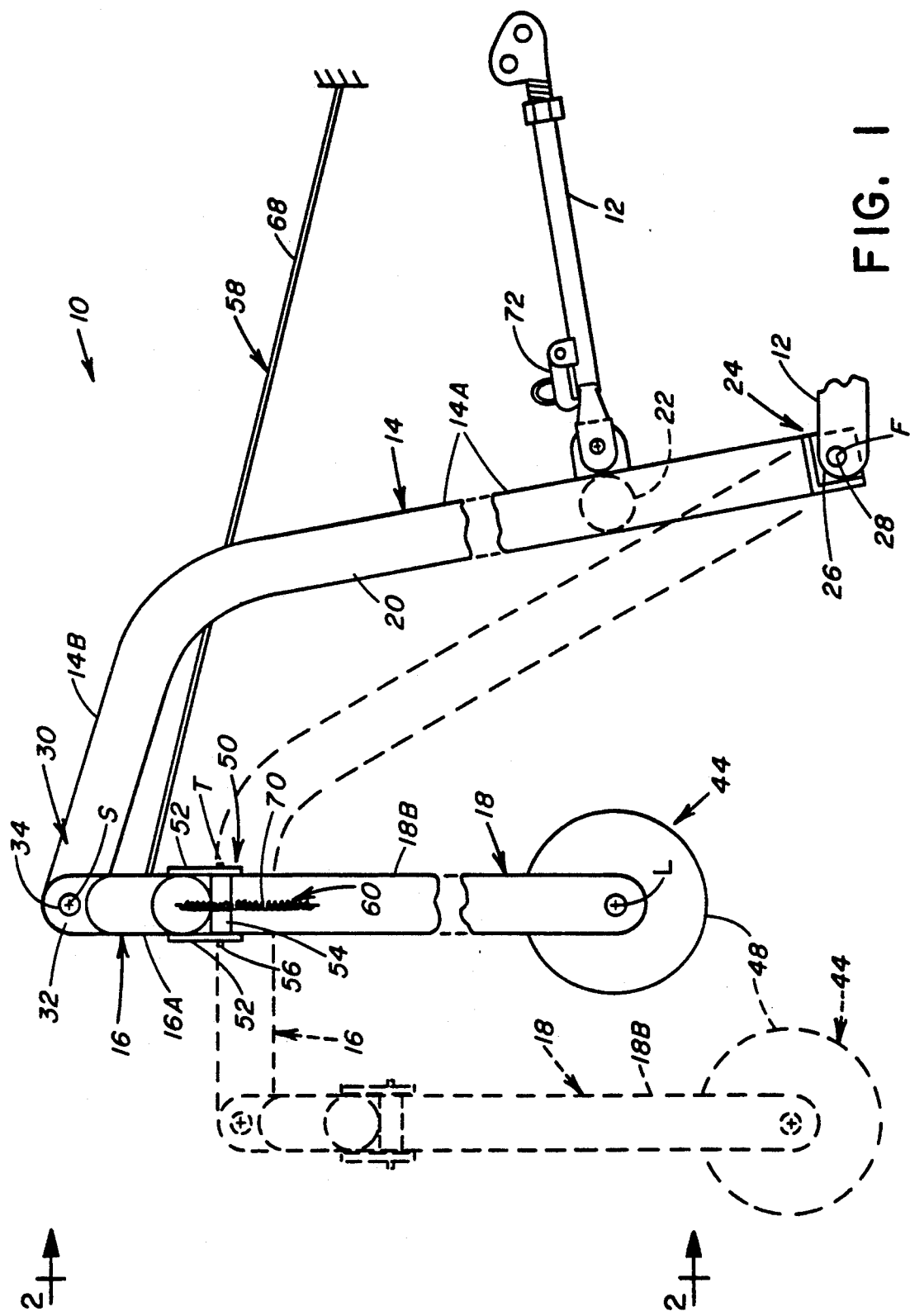
FIG. 1 is a side elevational view of a single large round bale handling apparatus constructed in accordance with the principles of the present invention.
Figure 2:
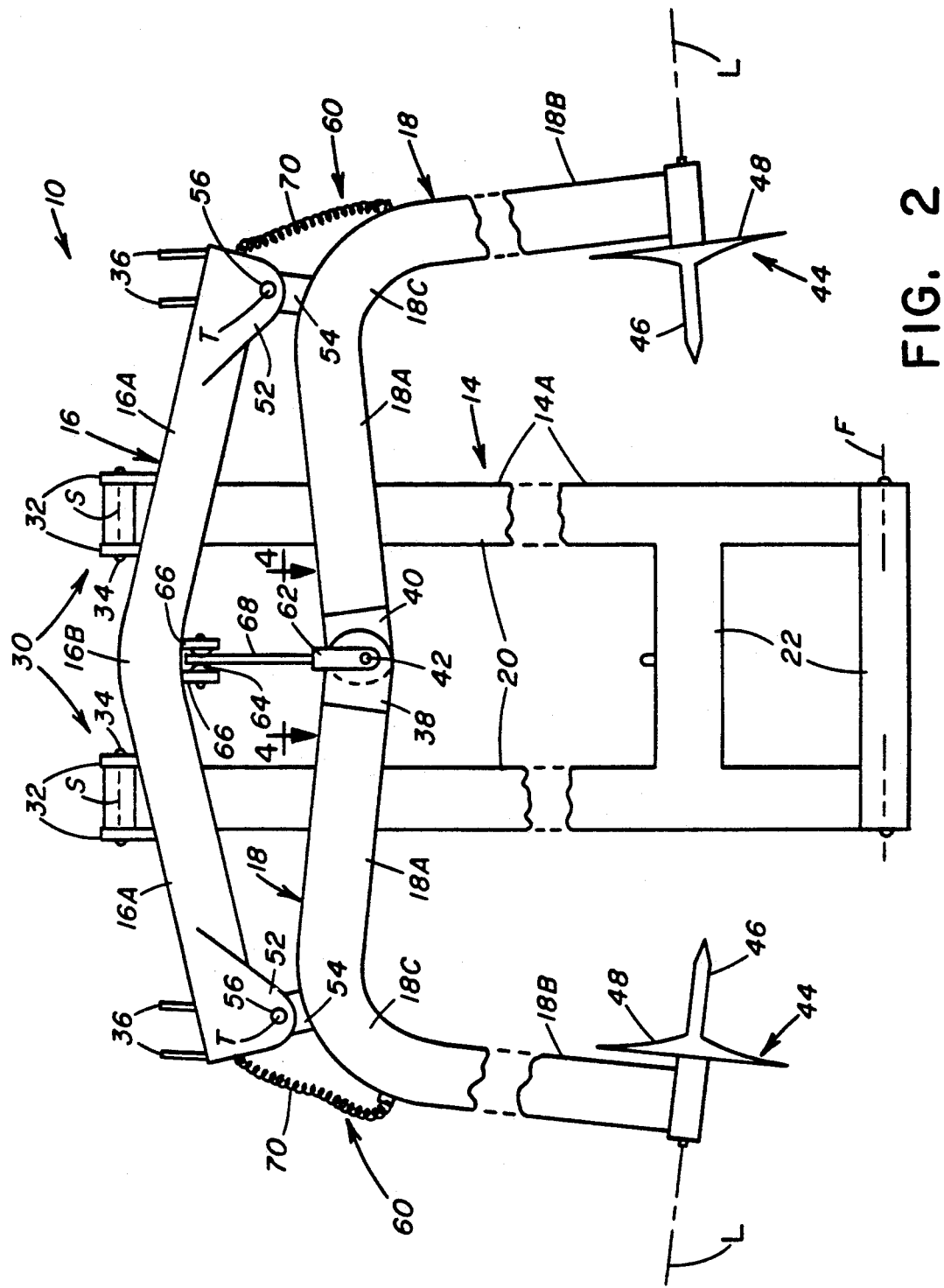
FIG. 2 is a front elevational view of the bale handling apparatus as seen along line 2—2 of FIG. 1 with a pair of pivotal lift arms thereof shown in an outer bale releasing position.

Referring to FIGS. 1-3, there is illustrated a preferred embodiment of a single large round bale handling apparatus of the present invention, generally designated 10. The bale handling apparatus 10 is versatile in that it can be supported by different types of mobile carriers, such as a wheeled trailer, a truck bed, or a three-point tractor hitch. The bale handling apparatus 10 being shown in FIGS. 1-3 is adapted for mounting to a three-point tractor hitch. For sake of simplicity, the mobile carrier is represented by the support links 12 of the three-point hitch shown in FIG. 1. The bale handling apparatus 10 can be operated to load, transport, and unload a large round bale as well as to unroll the large round bale on the ground when desired for feeding purposes.

Basically, the single large round bale handling apparatus 10 includes a generally upright elongated support frame 14, an upper cross beam 16, and a pair of lift arms 18. The upper cross beam 16 is pivotally mounted to the upper end of the upright support frame 14 and extends in transverse relation thereto. The lift arms 18 are pivotally mounted to opposite ends of the upper cross beam 16 so as to support the lift arms 18 below the upper cross beam 16, with the lift arms 18 being pivotally coupled together.

More particularly, the upright support frame 14 has a main portion 14A and an upper end portion 14B extending outwardly, for instance rearwardly, from the main portion 14A in an angular relationship relative to the plane of the main portion 14A. Preferably, the upright support frame 14 is constructed of a pair of longitudinal beams 20 and a cross bracing 22 extending between and rigidly interconnecting the longitudinal beams 20 in a fixed side-by-side spaced-apart relationship.

The bale handling apparatus 10 also includes a first pivotal coupling arrangement 24. The first pivotal coupling arrangement 24 is formed by a pair of apertured tabs 26 attached at the main portion and a pair of pivotal fasteners 28 rotatably mounted to the tabs 26 for mounting the support frame 14 to the support links 12. The first coupling arrangement 24 permits the support frame 14 to be mounted so that it can undergo pivotal movement relative to the support links 12 about first axes F extending in transverse relation to the support frame 14 between a generally upright bale carrying position, as shown in dashed line form in FIG. 1, and a rearwardly inclined bale loading and unloading position, as shown in solid line form in FIG. 1.

As seen in FIGS. 2 and 3, the upper cross beam 16 preferably has an inverted shallow V-shaped configuration. The cross beam 16 has substantial straight opposite leg portions 16A being interconnected by a curved or bent middle portion 16B. The bale handling apparatus 10 further includes a second pivotal coupling arrangement 30 which includes spaced first pairs of apertured brackets 32 rigidly attached to and extending upwardly from the upper cross beam 16 and a pair of pivot pins 34. The first pairs of brackets 32 are located on the leg portions 16A of the cross beam 16 being spaced the same distance, but in opposite directions, from the middle portion 16B thereof. The pivot pins 34 extend through the upper ends of the longitudinal beams 20 of the support frame 14 and the brackets 32 to pivotally connect the brackets 32 to the upper ends of the longitudinal beams 20.

By use of the second coupling arrangement 30, the upper cross beam 16 is supported below the upper ends of the longitudinal beams 20. Thus, the upper cross beam 16 extends in a transverse relation to the longitudinal beams 20 of the support frame 14 and can undergo pivotal movement relative to beams 20 about a second axis S extending generally parallel to the first axis F and extending transverse relation to the beams 20. The first pairs of brackets 32 are employed to adapt the bale handling apparatus 10 for mounting to the support links 12 of the three-point tractor hitch. Alternatively, second pairs of brackets 36 are provided at the opposite ends of the upper cross beam 16 for use to adapt the bale handling apparatus 10 for mounting to a mobile trailer or pickup truck bed.

Each of the lift arms 18 has an upper coupling portion 18A and a lower load bearing portion 18B rigidly interconnected by an elbow-shaped middle portion 18C. The upper coupling portion 18A of each lift arm 18 contains the upper end of the lift arm 18. The lower load bearing portion 18B of each lift arm 18 contains the lower end of the lift arm 18. As seen in FIGS. 2 and 4, the upper ends of the lift arms 18 have respective apertured links 38, 40 thereon pivotally coupled together by a pivot pin 42 so as to pivotally couple the lift arms 18 to one another at their upper ends. The lift arms 18 at their upper ends thereby undergo pivotal movement about an axis U defined by the pivot pin 42. The axis U extends in a transverse relation to both the upper and lower portions 18A, 18B of the lift arms 18.

The bale handling apparatus 10 also includes a pair of bale engaging members 44 in the form of elongated bale impaling prongs 46 with circular shields 48. The bale engaging members 44 are rotatably mounted at the lower ends of the lift arms 18. The impaling prongs 46 extend in generally facing relation to one another and undergo rotation about axes L extending transverse to the lower portions 18B and generally parallel to the upper portions 18A of the lift arms 18.

The bale handling apparatus 10 further includes a third pivotal coupling arrangement 50 between the upper cross beam 16 and the lift arms 18. The third coupling arrangement 50 is formed by spaced pairs of apertured brackets 52 rigidly attached to and depending from opposite ends of the upper cross beam 16, a pair hollow lugs 54 rigidly connected to the lift arms 18 at locations on the middle portions 18C thereof, and a pair of pivot pins 56 pivotally connecting the lugs 54 between the pairs of brackets 52. By use of the arrangement 50, the lift arms 18 are supported below the upper cross beam 16 in an aligned mirror image relationship to one another and can undergo pivotal movement about a pair of third axes T extending through the pivot pins 56 generally parallel to one another and transverse to the first and second axes F, S.

The bale handling apparatus 10 still further includes means 58 for applying a pulling force to the upper ends of the lift arms 18 and means 60 for applying a biasing force to the lift arms 18. The pulling force applying means 58 causes pivotal movement of the lift arms 18 relative to the upper cross beam 16 from the outer bale releasing position of FIG. 2 to the inner bale gripping position of FIG. 3. The biasing force applying means 60 plus the greater weight distribution in the lower portions 18B of the lift arms 18 than in the upper portions 18A thereof causes pivotal movement of lift arms 18 relative to the upper cross beam 16 from the inner bale gripping position of FIG. 3 back to the outer bale releasing position of FIG. 2 upon release of application of the pulling force to the lift arms 18.

The pulling force applying means 58 includes an inverted U-shaped link 62 pivotally coupled to the pivot pin 42 that pivotally-couples the links 38, 40 on the inner ends of the lift arms 18 to one another. The pulling force applying means 58 also includes a guide element 64 in the form of an idler pulley rotatably mounted between a pair of tabs 66 attached to and depending from the middle portion 16B of the upper cross beam 16 above the pivotal link 62. Further, the pulling force applying means 58 includes an elongated flexible member 68 in the form of a flexible cable attached at one end to the pivotal link 62 and extending over the idler pulley 64 to an opposite end for attachment to an external device (not shown), such as a fixed location on a tractor when the apparatus 10 is mounted to the three-point tractor hitch or to a power winch or hydraulic cylinder when the apparatus 10 is mounted upon a mobile trailer or pickup truck bed.

The biasing force-applying means 60 is a pair of elongated springs 70 attached at their respective opposite ends to and extending between the respective lower load bearing portions 18B of the lift arms 18 and the opposite ends of the upper cross beam 16. The springs 70 function to apply respective biasing forces to the lift arms 18 to cause them to pivotally move from the inner bale gripping position of FIG. 3 back to the outer releasing position of FIG. 2 upon releasing of the application of the pulling force on the upper ends of the lift arms 18 by the pulling force applying means 58.

In the situation shown in FIG. 1 where the bale handling apparatus 10 is mounted to the three-point tractor hitch, the flexible cable 68 is maintained at a fixed length and the hitch is actuated by the tractor operator to raise and lower the support frame 14 relative to the flexible cable 68 and thereby cause the flexible cable 68 to apply and release the pulling force to and from the lift arms 18. During final lowering of the support frame 14, the upper link 12 of the three-point hitch is latched by a releasable pawl 72 to the support frame 14 so as to hold the support frame 14 at its rearwardly inclined bale loading and unloading position seen in solid line form in FIG. 1. With the support frame 14 supported by the three-point hitch, final lowering of the support frame reduces the distance between the idler pulley 64 and the fixed location of attachment of the cable 68 to the tractor sufficiently to allow releasing of the application of the pulling force and thereby pivoting of the lift arms 18 from their inner gripping position of FIG. 3 to their outer releasing position of FIG. 2 and permit positioning of the lift arms 18 on opposite sides of a large round bale to be loaded. Then, initiating the raising of the support frame 14 increases the distance between the idler pulley 64 and the fixed location of attachment of the cable 68 to the tractor sufficiently to cause applying of the pulling force and thereby pivoting of the lift arms 18 from their outer releasing position of FIG. 2 to their inner gripping position of FIG. 3 so as to engage the bale at opposite side with the bale impaling prongs 46. Once the lift arms 18 have reached their inner gripping position of FIG. 3, the pawl 72 is released. During continued raising of the support frame 14, the load of the support frame and the bale carried by the lift arms 18 is borne by the cable 68. Such continued raising of the apparatus 10 can no longer increase the distance between the apparatus 10 and the fixed location on the tractor, but instead causes the support frame 14, and therewith the upper cross beam 16 and lift arms 18 carrying the bale, to move from the solid-line rearwardly inclined bale loading and unloading position of FIG. 1 to the dashed-line upright bale carrying position of FIG. 1.

In the situation (not shown) where the support frame 14 of the bale handling apparatus 10 is pivotally mounted to either the bed of a mobile trailer or of a pickup truck, the flexible cable 68 is not maintained at a fixed length. Instead, the length of the flexible cable 68 is decreased or increased by operation of a suitable mechanism, such as a power winch or an extensible and retractible hydraulic cylinder to cause the respective movements of the support frame 14 between the rearwardly inclined bale loading and unloading position and upright bale carrying position and of the lift arms 18 between the outer bale releasing position and inner bale gripping position.

As mentioned earlier, the bale handling apparatus 10 can be employed to unroll a bale on the gound. Due to the rotatable mounting of the bale engaging members 44 on the lower ends of the lift arms 18, a bale while gripped between the lift arms 18 can be lowered in contact with the ground and rotated relative to the lift arms 18 and unrolled on the ground by moving the apparatus 10 in the forward direction.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A single large round bale handling apparatus, comprising:
   (a) an elongated generally upright-extending support frame;
   (b) an upper cross beam mounted to an upper end of the support frame and extending in transverse relation thereto;
   (c) a pair of lift arms having upper ends pivotally connected together and lower ends mounting a pair of bale engaging members in generally facing relation toward one another, said lift arms being mounted to and supported below said upper cross beam to undergo pivotal movement relative to said upper cross beam and thereby relative to one another between an inner bale gripping position and an outer bale releasing position in which said bale engaging members are disposed closer to one another in said inner gripping position than in said outer releasing position of said lift arms;
   (d) means for applying a pulling force to said upper ends of said lift arms so as to cause pivotal movement of said lift arms relative to said upper cross beam from said outer bale releasing position to said inner bale gripping position, said pulling force applying means including a guide element mounted to said upper cross beam and an elongated flexible member attached at one end to said upper ends of said lift arms and extending over said guide element and therefrom for attachment to an external device such that relative movement between said flexible member and said support frame causes a pulling force to be applied to said upper ends of said lift arms by said flexible member and thereby pivotally moves said lift arms relative to one another and to said upper cross beam from said outer bale releasing position to said inner bale gripping position; and
   (e) means for applying a biasing force to said lift arms so as to cause pivotal movement of said lift arms relative to said upper cross beam from said inner bale gripping position back to said outer bale releasing position upon release of application of the pulling force to said lift arms.

2. The apparatus of claim 1 wherein said support frame includes a main portion and an upper end portion extending in angular relationship relative to said main portion thereof.

3. The apparatus of claim 1 wherein said support frame includes a pair of longitudinal beams having respective upper and lower ends and being disposed in a fixed side-by-side spaced-apart relationship.

4. The apparatus of claim 3 further comprising:
   a pivotal coupling arrangement pivotally connecting said upper cross beam to said upper ends of said longitudinal beams such that said upper cross beam is supported below said respective upper ends of said longitudinal beams, extends in transverse relation thereto and can undergo pivotal movement relative thereto.

5. The apparatus of claim 4 wherein:
   said lift arms have substantially identical arcuate shapes;
   each of said lift arms includes an upper coupling portion and a lower load bearing portion; and
   each of said bale engaging members is a bale impaling prong mounted to a respective lower end of said load bearing portion of one of said lift arms.

6. The apparatus of claim 5 wherein each of said lift arms has an elbow-shaped middle portion rigidly interconnecting said upper coupling portion and said lower load bearing portion.

7. The apparatus of claim 6 further comprising:
   a pivotal connecting arrangement pivotally connecting said lift arms to opposite ends of said upper cross beam at said elbow-shaped portions on said lift arms between said upper and lower portions thereof such that said lift arms are supported below said upper cross beam in an aligned mirror image relationship to one another and can undergo pivotal movement relative to said upper cross beam.

8. The apparatus of claim 3 further comprising:
   a pivotal mounting arrangement for mounting said support frame at said lower ends of said longitudinal beams to a mobile carrier to enable said support frame to undergo pivotal movement relative to the mobile carrier between a generally upright bale carrying position and a generally rearwardly inclined bale loading and unloading position.

9. The apparatus of claim 1 wherein said pulling force applying means is further operable, once said lift arms reach said bale gripping position and upon continued relative movement between said flexible member and said support frame, to cause said support frame, and said upper cross beam and lift arms therewith, to move from said rearwardly inclined bale loading and unloading position toward said upright bale carrying position.

10. The apparatus of claim 1 wherein said biasing force applying means includes a pair of elastic members respectively connected between said lower portions of said lift arms and opposite ends of said upper cross beam so as to apply a biasing force on said lift arms to cause said lift arms to undergo pivotal movement to said releasing position.

11. A single large round bale handling apparatus, comprising:
   (a) an elongated generally upright support frame having a main portion and an upper end portion extending outwardly in an angular relationship relative to the main portion, said support frame at a lower end of said main portion being mountable to a mobile carrier for undergoing pivotal movement relative thereto about a first axis;
   (b) an upper cross beam having a pair of opposite ends and extending in a transverse relation to said upper end portion of said support frame, said upper cross beam being mounted to an upper end of said upper end portion of the support frame so as to undergo pivotal movement about a second axis extending generally parallel to said first axis;
   (c) a pair of lift arms each having an upper coupling portion and a lower load bearing portion with an upper end of each lift arm on said upper coupling portion and a lower end of each lift arm on said lower load bearing portion, each of said lift arms at locations between said upper coupling portion and lower load bearing portion thereof being respectively mounted to one of said opposite ends of said upper cross beam so that said lift arms are supported below said upper cross beam and so that said lift arms undergo pivotal movement about a pair of third axes extending generally parallel to one another and transverse to said first and second axes, said lift arms being pivotally coupled together at said upper ends of said upper coupling portions thereof;

(d) a pair of bale engaging members mounted at said respective lower ends of said lower load bearing portions of said lift arms so as to generally face toward one another;

(e) an elongated flexible member guided about a guide element mounted to said upper cross beam and disposed above said pivotally coupled upper ends of said lift arms, said flexible member being attached to said upper ends of said lift arms for applying a pulling force to said upper ends of said lift arms upon relative movement between said flexible member and said support frame to pivotally move said lift arms from an outer releasing position to an inner clamping position; and (f) a pair of elastic stretchable members mounted between said respective lower load bearing portions of said lift arms and said opposite ends of the upper cross beam for applying biasing forces to said lift arms to pivotally move said lift arms from said inner clamping position back to said outer releasing position upon releasing application of the pulling force.

12. The apparatus of claim 11 wherein said lift arms have substantially identical arcuate shapes.

13. The apparatus of claim 11 wherein each of said bale engaging members is an elongated bale impaling prong mounted to a respective lower end of each of said lift arms.

14. The apparatus of claim 11 wherein each of said elastic stretchible members is an elongated spring.

15. The apparatus of claim 11 wherein said flexible member is an elongated cable.

16. A single large round bale handling apparatus, comprising (a) an elongated generally upright support frame having a main portion and an upper end portion extending outwardly in an angular relationship relative to the main portion, said support frame including a pair of longitudinal beams having respective pairs of upper and lower opposite ends, and a ross bracing extending between and rigidly interconnecting said longitudinal beams in a fixed side-by-side spaced-apart relationship;

(b) a first pivotal coupling arrangement for mounting said support frame at said lower ends of said longitudinal beams to a mobile carrier for undergoing pivotal movement relative to the mobile carrier about a first axis between a generally upright bale carrying position and a generally rearwardly inclined bale loading and unloading position;

(c) an upper cross beam having a pair of opposite ends;

(d) a second pivotal coupling arrangement extending between and interconnecting said upper cross beam and said upper end portion of said support frame at said upper ends of said longitudinal beams, said second coupling arrangement supporting said upper cross beam below said respective upper ends of said longitudinal beams such that said upper cross beam extends in transverse relation thereto and can undergo pivotal movement relative thereto about a second axis extending generally parallel to said first axis;

(e) a pair of arcuate-shaped lift arms each having an upper coupling portion and a lower load bearing portion rigidly interconnected by an elbow-shaped middle portion with an upper end of each lift arm on said upper coupling portion thereof and a lower end of each lift arm on said lower load bearing portion thereof, said lift arms being pivotally coupled together at said upper ends of said upper coupling portions thereof;

(f) a pair of elongated bale impaling prongs mounted at said respective lower ends of said lower load bearing portions of said lift arms so as to generally face toward one another;

(g) a third pivotal coupling arrangement extending between and interconnecting said opposite ends of said upper cross beam and each of said lift arms at said elbow-shaped middle portions so as to support said lift arms in an aligned mirror image relationship to one another below said upper cross beam and to enable pivotal movement of said lift arms about a pair of third axes extending generally parallel to one another and transverse to said first and second axes;

(h) means for applying a pulling force including a link pivotally coupled to said pivotally-coupled upper ends of said lift arms, a guide element mounted to said upper cross beam above said link, and an elongated flexible cable attached at one end to said link and extending over said guide element and therefrom for attachment to an external device such that relative movement between said flexible cable and said support frame causes a pulling force to be applied to said upper ends of said lift arms, via said link, by said flexible cable and thereby to pivotally move said lift arms relative to one another and to said upper cross beam from said outer bale releasing position to said inner bale gripping position and such that, once said lift arms reach said bale gripping position, continued relative movement between said flexible cable and said support frame causes said support frame, and said upper ross beam and lift arms therewith, to move from said rearwardly inclined bale loading and unloading position toward said upright bale carrying position; and (i) a pair of elongated springs mounted between said respective lower load bearing portions of said lift arms and said opposite ends of the upper cross beam and applying biasing forces to said lift arms to pivotally move said lift arms from said inner gripping position back to said outer releasing position upon releasing of the application of the pulling force.

* * * * *